United States Patent [19]

Miura

[11] Patent Number: 5,680,758
[45] Date of Patent: Oct. 28, 1997

[54] ASSEMBLY OF A ONE-WAY CLUTCH AND A BEARING

[75] Inventor: Yoshihisa Miura, Yamatokoriyama, Japan

[73] Assignee: Koyo Seiko Co., Ltd., Osaka, Japan

[21] Appl. No.: 605,671

[22] Filed: Feb. 22, 1996

[30] Foreign Application Priority Data

Mar. 7, 1995 [JP] Japan .................................. 7-077380

[51] Int. Cl.$^6$ .................................................. F16D 33/00
[52] U.S. Cl. ........................................................ 60/345
[58] Field of Search ...................................... 60/345, 346

[56] References Cited

U.S. PATENT DOCUMENTS

| | | |
|---|---|---|
| 4,953,353 | 9/1990 | Lederman ................................. 60/345 |
| 5,094,076 | 3/1992 | Henricks ................................... 60/345 |
| 5,224,576 | 7/1993 | Fujimoto . | |

FOREIGN PATENT DOCUMENTS 245491  8/1960  Australia ................................. 60/345

Primary Examiner—F. Daniel Lopez
Attorney, Agent, or Firm—Reid & Priest L.L.P.

[57] ABSTRACT

An assembly of a one-way clutch and a liquid thrust bearing is provided which can absorb an axial load due to a stator of a torque converter, thereby reducing the number of parts as compared to a conventional torque converter using a mechanical thrust bearing. In order to attain the object, the one-way clutch is mounted on a boss portion of a stator of a torque converter, a bearing support is disposed between outer and inner rings of the one-way clutch, a turbine-side member of the torque converter is disposed with a fixed inwardly facing surface facing an outwardly facing surface of the bearing support with a small open annular gap being between the facing surfaces and dynamic pressure grooves formed in one of the facing surfaces for providing a high pressure liquid layer between the facing surface which acts as a thrust bearing.

2 Claims, 6 Drawing Sheets

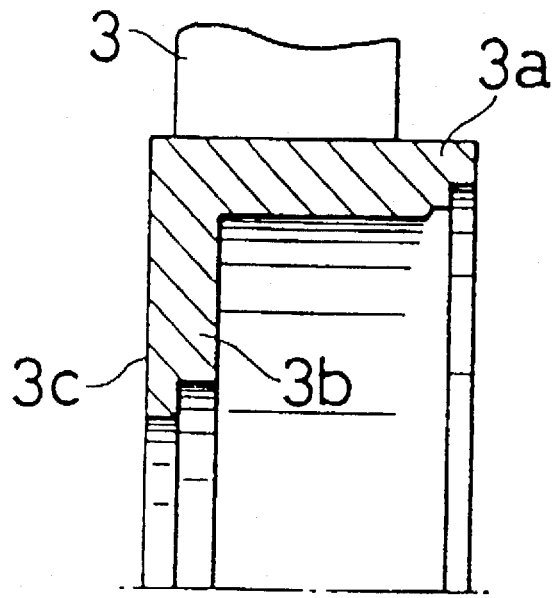
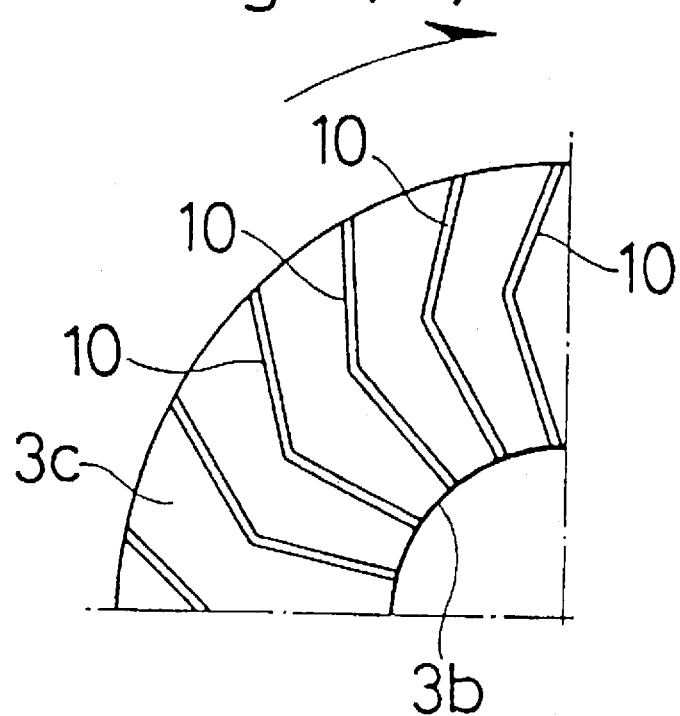

ASSEMBLY OF A ONE-WAY CLUTCH AND A BEARING

BACKGROUND OF THE INVENTION

The invention relates to an assembly of a one-way clutch and a bearing which is to be mounted on a stator of a torque converter, and particularly to an assembly of a one-way clutch and a bearing in which a thrust bearing (needle bearing) or the like is eliminated.

In a torque converter which is used as an automatic transmission for an automobile, as shown in FIG. 4, a pump impeller 2 is rotated by an output shaft 1 which is driven by an engine so as to cause through an ATF (automatic transmission fluid) a turbine runner 4 to rotate. The rotational torque of the turbine runner 4 is increased via a stator 3 so that the power is transmitted to an input shaft 5 of the transmission. A one-way clutch 6 is mounted on the stator 3. An inner ring 6b of the one-way clutch 6 is mounted on a stationary shaft 11 which is disposed around the input shaft 5, in such a manner that the inner ring is disabled to rotate by means of spline fitting or the like. Depending on the vane angle of the stator 3, an axial load is applied to the one-way clutch 6. In order to absorb the load, thrust bearings 12 and 13 are disposed on opposite sides of the one-way clutch 6, respectively.

FIG. 5 shows an example of a conventional thrust needle roller bearing which is to be disposed on opposite sides of the one-way clutch 6 mounted on the stator 3. An outer ring 6a of the one-way clutch 6 is fitted into a boss portion 3a of the stator 3. The inner ring 6b is disposed so as to be disabled to rotate by means of a spline or the like. An engagement member 14 is disposed between the outer and inner rings 6a and 6b. A bearing support 15 is fitted into one side of the space between the outer and inner rings 6a and 6b of the one-way clutch 6. One end of the bearing support is fixed to the boss portion. A thrust bearing 12 is disposed outside the bearing support. A thrust washer 16 is disposed on the other side of the stator 3. As shown alternatively in FIGS. 4 and 6, the thrust bearings 12 and 13 may be disposed on the both sides of the stator 3.

The thrust needle roller bearings 12 and 13 which are disposed on one side of or the both sides of the one-way clutch 6 have a large number of parts such as a track plate, a retainer, and a needle and hence their configuration is complicated. This produces a problem in that the accessibility to the vicinity of the one-way clutch 6 is reduced. Furthermore, there arises a further problem in that the thrust needle roller bearings occupy a substantial space in the axial direction so as to cause the transmission to have an axial length that is greater than would be necessary if these bearings were not present.

SUMMARY OF THE INVENTION

The invention reduces the above-discussed problems. It is an object of the invention to provide an assembly of a one-way clutch and a bearing which can absorb an axial load due to a stator, and in which a thrust bearing is not required to be disposed in the vicinity of the one-way clutch mounted on the stator, thereby reducing the number of parts.

In order to solve the above-discussed problems, it is an object of the invention to provide an assembly of a one-way clutch and a bearing wherein a bearing support is disposed between outer and inner rings of the one-way clutch to be mounted on a boss portion of a stator of a torque converter, a stationary portion of the torque converter is disposed with opposing an outer side face of the bearing support with forming a small gap between the portion and the outer side face, and dynamic pressure grooves are formed in an opposing face of at least one of the bearing support and the stationary portion of the torque converter.

It is another object of the invention to provide an assembly of a one-way clutch and a bearing wherein a bearing support is disposed on one side of a space between outer and inner rings of the one-way clutch to be mounted on a boss portion of a stator of a torque converter, a flange is formed by radially extending a part of the boss portion of the stator, the part being opposite to the bearing support, a stationary portion of the torque converter is disposed with opposing outer side faces of the bearing support and the flange with forming a small gap between the portion and the outer side faces, and dynamic pressure grooves are formed in an opposing face of at least one of the bearing support and the stationary portion of the torque converter, and in an opposing face of at least one of the flange and the stationary portion of the torque converter.

In the thus configured assembly of a one-way clutch and a bearing, a high pressure is generated in the gap between the bearing support and the turbine-side member of the torque converter during the period when the stator rotates. Therefore, the dynamic pressure grooves formed in the surface of the bearing support can be provided with the function of a bearing.

When the stator rotates, a high pressure is generated in the gap between the bearing support and the turbine-side member of the torque converter and also in that between the surface of the flange of a boss portion of the stator and the pump-side member of the torque converter. Therefore, the dynamic pressure grooves which are formed in the surfaces of the bearing support and the flange of the boss portion of the stator can be provided with the function of a bearing.

BRIEF DESCRIPTION OF THE DRAWINGS

FIG. 3(A) is a partial section view of a stator of a torque converter, and FIG. 3(B) is a partial side view of the stator;

DETAILED DESCRIPTION OF THE PREFERRED EMBODIMENTS

Hereinafter, embodiments of the invention will be described with reference to the accompanying drawings.

Figure 1:
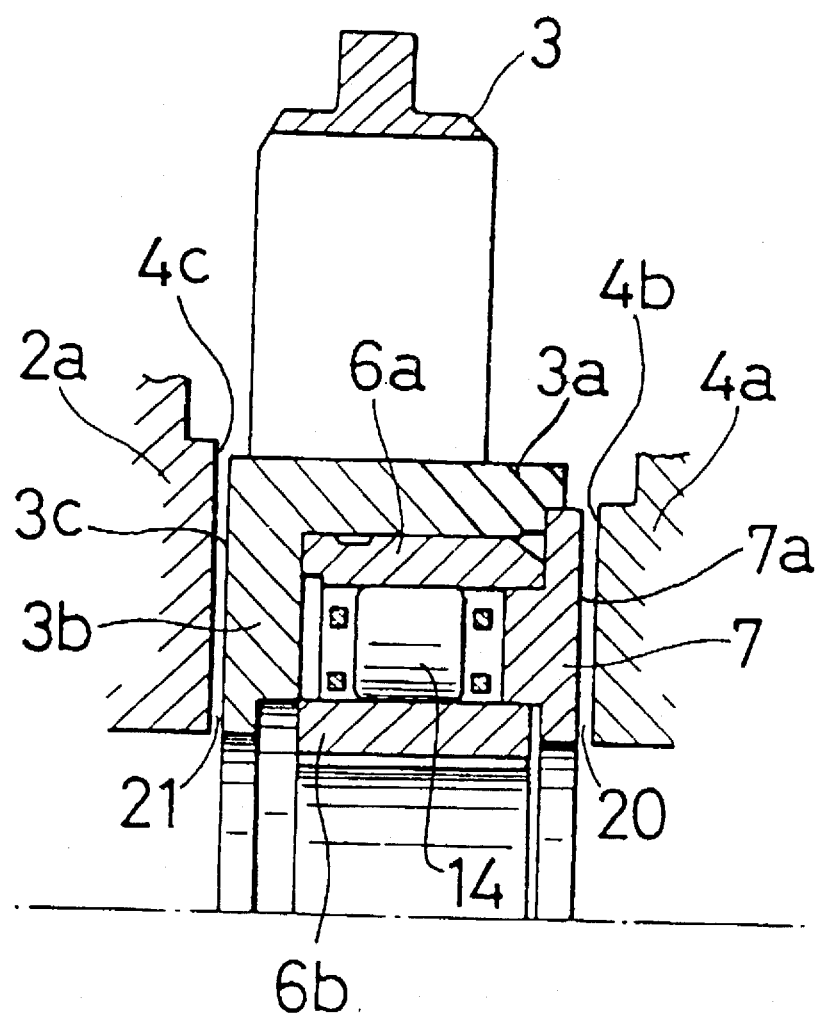
FIG. 1 is an axial section view of the assembly of a one-way clutch and a bearing according to the invention.
Figure 5:
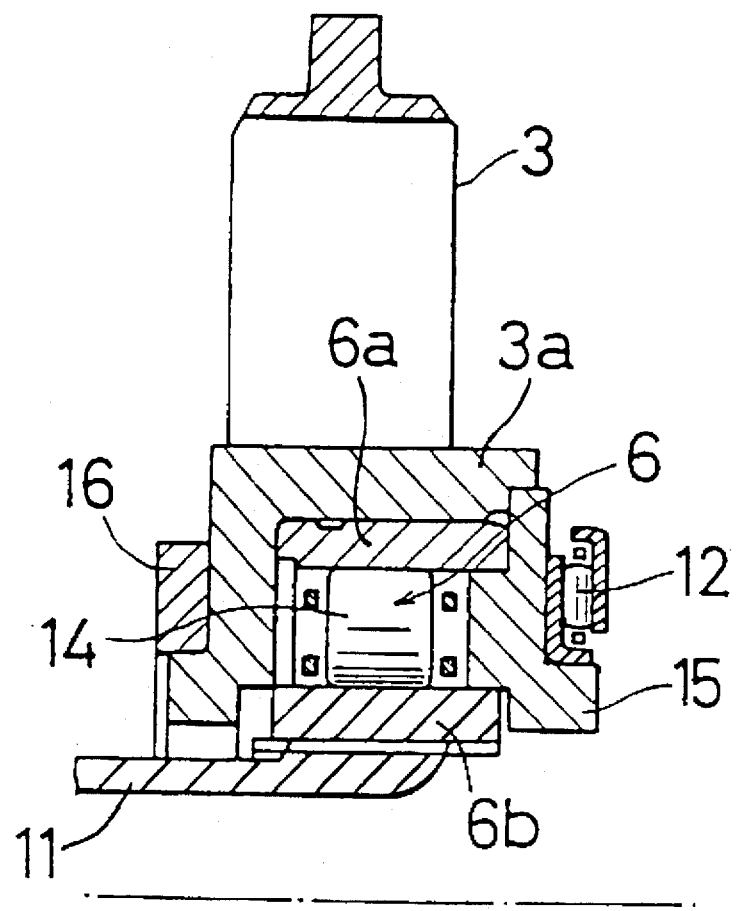
FIG. 5 is an axial section view of a prior art assembly of a one-way clutch and a bearing.

FIG. 1 is an axial section view of the assembly of a one-way clutch and a bearing according to the invention. The assembly is disposed in the vicinity of a stator 3 of a torque converter. An outer ring 6a of the one-way clutch 6 is fitted into a boss portion 3a of the stator 3. A bearing support 7 is disposed on one side face of the outer ring 6a while being fixed to the inner periphery of the outer ring 6a. The fixation of the bearing support 7 is done by extending one end portion 7a toward the boss portion 3a so as to be fixed in a nonrotatable manner to the boss portion 3a by adequate means. The one-way clutch is configured in the same manner as the prior art clutch of FIG. 5, and an engagement member 14 is disposed between the outer and inner rings 6a and 6b. A turbine-side member 4a of the torque converter is disposed so that it faces the outer side face of the bearing support 7 with a small gap 20 being provided therebetween. A flange 3b is formed in the other side of the boss portion 3a of the stator 3. A pump-side member 2a of the torque converter is disposed with opposing on the outer side face of the flange 3b with forming a small gap 21 therebetween.

Figure 2:
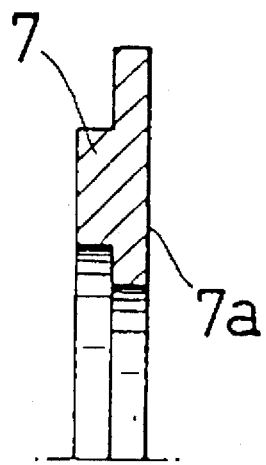
FIG. 2(A) is a partial section view of a bearing support which is to be attached to a one-way clutch mounted on a stator.
FIG. 2(B) is a partial side view of the bearing support.
Figure 2:
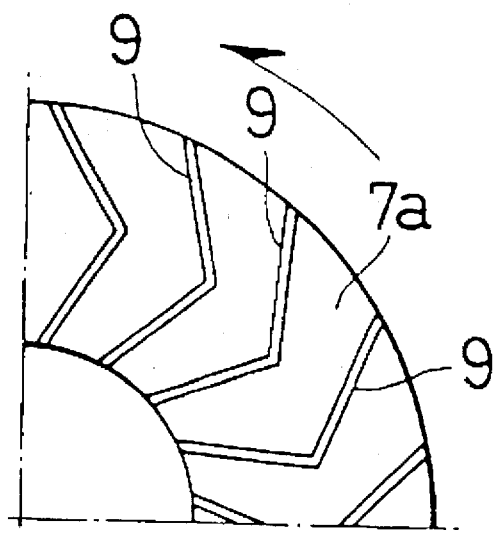
Figure 4:
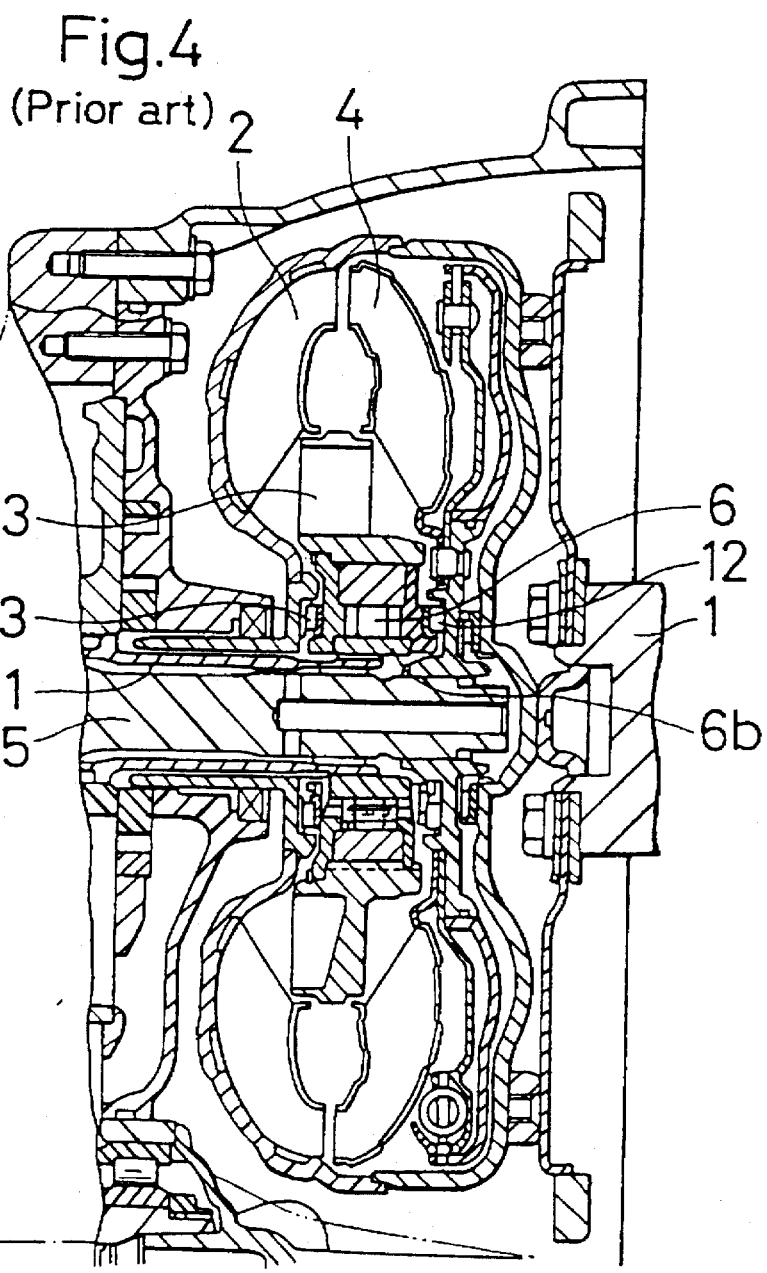
FIG. 4 is an axial section view of the vicinity of prior art a pump, a turbine, and a stator in a torque converter.

FIG. 2(A) is a partial section view of the bearing support 7, and FIG. 2(B) is a partial side view of the bearing support. Dynamic pressure grooves 9 are formed on the outer side face 7a of the bearing support 7. The stator 3 rotates in one direction. At this time, also the bearing support 7 is integrally rotated. The dynamic pressure grooves 9 are formed in the outer side face 7a of the bearing support 7 in a direction which is selected so that a dynamic pressure due to the automatic transmission fluid is generated when the bearing support 7 rotates in the direction of the arrow in FIG. 2(B). As illustrated, the dynamic pressure grooves 9 may be those formed as shown in a V-like pattern at constant intervals in the circumferential direction. As far as a dynamic pressure can be generated, the grooves may have any shape including a herringbone-like shape, or triangular wave-like shape.

In the configuration in which the dynamic pressure grooves 9 are formed in the outer side face 7a of the bearing support 7 as described above, a high pressure is generated in the gap 20 between the face and the turbine-side member 4a of the torque converter during the period when the stator 3 rotates. Therefore, the dynamic pressure grooves 9 formed in the surface 7a of the bearing support 7 create a pressure in gap 20 which functions as a thrust bearing between surface 7a and the facing surface of turbine side member 4a. Alternatively, dynamic pressure grooves may be formed in the outer side face of the turbine-side member 4a of the torque converter which opposes the bearing support 7.

FIG. 3(A) is a partial section view of the stator 3, and FIG. 3(B) is a side view of the stator. Dynamic pressure grooves 10 are formed in the outer side face 3c of the flange 3b of the boss portion 3a of the stator 3 which rotates in one direct. Side face 3c faces surface 4c of the torque converter and is separated therefrom by a continuous open gap 21 as shown in FIG. 1. The dynamic pressure grooves 10 are formed in a direction which is selected so that a dynamic pressure due to the automatic transmission fluid is generated when the stator 3 rotates in the direction of the arrow in FIG. 3(B). As illustrated, the dynamic pressure grooves 10 may be those formed into a V-like pattern at constant intervals in the circumferential direction as shown. As far as a dynamic pressure can be generated, the grooves may have any shape including a herringbone-like shape. In the configuration in which the dynamic pressure grooves 10 are formed in the surface 3c of the flange 3b of the boss portion 3a of the stator as described above, a high pressure is generated in the gap 21 between the surface and the pump-side member 2a of the torque converter during the period when the stator 3 rotates. Therefore, the dynamic pressure grooves 10 formed in the surface 3c of the flange 3b of the boss portion 3a of the stator 3 create a pressure in gap 21 which functions as a thrust bearing between member 2a and 3b. Alternatively, dynamic pressure grooves may be formed in the surface of the pump-side member 2a of the torque converter which opposes the flange 3b of the boss portion 3a of the stator 3.

Figure 6:
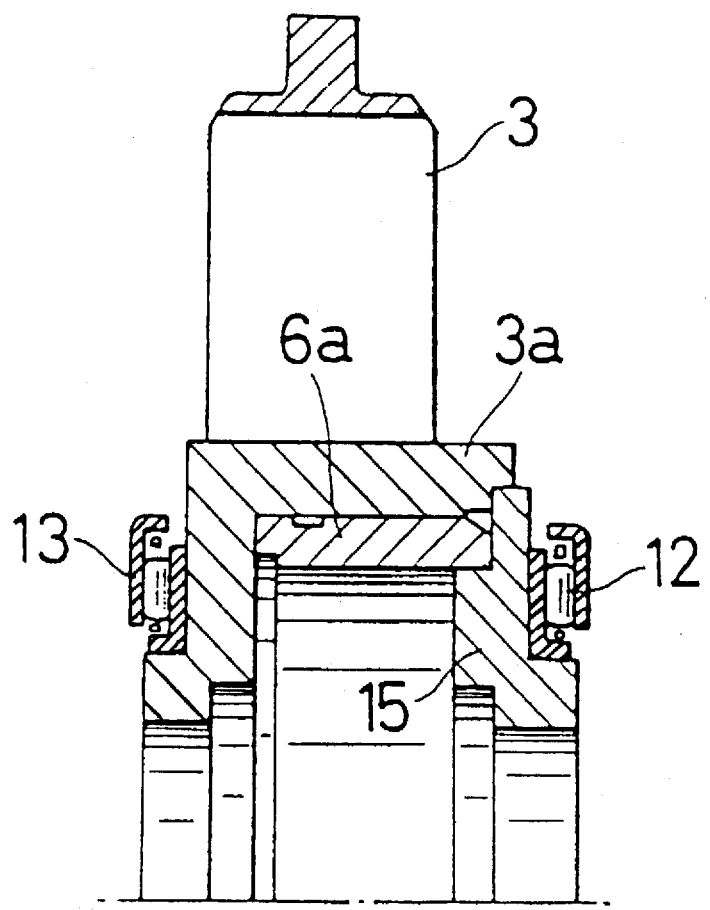
FIG. 6 is an axial section view of a prior art assembly of a one-way clutch and a bearing.

In the assembly of a one-way clutch and a bearing according to the invention, as described above, the dynamic pressure grooves 9 are formed in the outer side face 7a of the bearing support 7 or the dynamic pressure grooves 10 are formed in the outer side face 3c of the flange 3b of the boss portion 3a of the stator 3. Alternatively, the dynamic pressure grooves 9 may be formed in the surface 7a of the side face of the bearing support 7 and a thrust washer 16 (see FIG. 5) or a thrust needle roller bearing 13 (see FIG. 6) may be disposed on the side of the flange 3b of the boss portion 3a of the stator 3. In contrast, the dynamic pressure grooves 10 may be formed in the surface of the flange 3b of the boss portion 3a of the stator 3 and the thrust washer 16 or a thrust needle roller bearing 12 (see FIG. 6) may be disposed on the side of the bearing support Alternatively, two bearing support members 7 may be employed so that one bearing support member engages one end of the one-way clutch 6 with the other bearing support member engaging the other end of the one-way clutch 6. Also, the dynamic pressure grooves 9 may be formed in the surfaces 7a of the bearing supports 7 on the one-way clutch 6.

In the assembly of a one-way clutch and a bearing, the dynamic pressure grooves 9 may be formed in the surface 7a of the side face of the bearing support 7, the dynamic pressure grooves 10 may be formed in the surface of the flange 3b of the boss portion 3a of the stator 3, and dynamic pressure grooves may be formed also in the surfaces of the turbine-side member 4a and a pump-side member of the torque converter which oppose the bearing support 7 and the flange 3b of the boss portion 3a of the stator 3.

When the assembly of a one-way clutch and a bearing is configured as described above, a dynamic pressure is generated as the stator rotates, in the gap 20 between the bearing support 7 and the turbine-side member 4a of the torque converter and also in the gap 21 between the flange 3b of the boss portion 3a of the stator 3 and the pump-side member 2a of the torque converter. Therefore, the generated dynamic pressures can exert the function of a dynamic pressure bearing. In the configuration, therefore, it is not necessary to dispose a thrust washer, a thrust needle roller bearing, and the like on the both sides of the one-way clutch.

As described above in detail, in the assembly of a one-way clutch and a bearing according to the invention, the disposition of a bearing such as a thrust needle roller bearing or a thrust washer is not required in at least one of the sides of the one-way clutch of a stator, and hence the number of parts can be reduced so that the cost reduction is attained. Since a thrust needle roller bearing can be eliminated, the space in the axial direction can be omitted. This enables a ultra thin torque converter to be developed. Furthermore, it is possible to simplify the shape of the side faces of the stator and the bearing support (for example, a stepless shape), thereby allowing the working cost to be reduced.

What is claimed is:

1. A torque converter assembly including a stator having a boss portion, a one-way clutch mounted on said boss portion and including an inner ring and an outer ring, a bearing support disposed between said inner and outer rings of said one-way clutch and having an outer side face, a stationary portion of said torque converter having a fixed face disposed opposite to and facing said outer side face of said bearing support with a continuous open annular gap being between said fixed face of said torque converter and said outer side face of said bearing support, and dynamic pressure grooves formed in one of said outer said face of said bearing support or said fixed face of said torque converter so as to create a thrust bearing effect.

2. A torque converter assembly, including:
a stator having a boss portion including a radial flange at one end, said radial flange having an outer side face, a one-way clutch mounted on said boss portion and including an inner ring and an outer ring, a stationary portion of said torque converter having a fixed inward facing surface disposed opposite to and facing said outer side face of said radial flange of said boss portion, a continuous open annular gap provided between said outer side face of said radial flange and said inward facing surface of said torque converter and dynamic pressure grooves formed in one of said fixed inwardly facing surface of said stationary portion of said torque converter or said outer side face of said radial flange of said boss portion so as to create a thrust bearing effect.

* * * * *